US012741496B2

(12) United States Patent
Kim et al.

(10) Patent No.: US 12,741,496 B2
(45) Date of Patent: Sep. 22, 2026

(54) BUSHING FOR TRAILING ARM

(71) Applicants: Hyundai Motor Company, Seoul (KR); Kia Corporation, Seoul (KR); DAEHEUNG R&T CO., LTD., Gimhae-Si (KR)

(72) Inventors: Min U Kim, Geoje-si (KR); Se Young Kim, Gimhae-Si (KR); Jin Wook Park, Busan (KR)

(73) Assignees: Hyundai Motor Company, Seoul (KR); Kia Corporation, Seoul (KR); DAEHEUNG R&T CO., LTD., Gimhae-Si (KR)

( * ) Notice: Subject to any disclaimer, the term of this patent is extended or adjusted under 35 U.S.C. 154(b) by 848 days.

(21) Appl. No.: 17/991,407

(22) Filed: Nov. 21, 2022

(65) Prior Publication Data

US 2023/0339277 A1 Oct. 26, 2023

(30) Foreign Application Priority Data

Apr. 21, 2022 (KR) ........................ 10-2022-0049611

(51) Int. Cl.
*B60G 11/22* (2006.01)

(52) U.S. Cl.
CPC ........ *B60G 11/22* (2013.01); *B60G 2200/132* (2013.01); *B60G 2202/14* (2013.01); *B60G 2204/41* (2013.01); *B60G 2206/72* (2013.01); *B60G 2800/162* (2013.01)

(58) Field of Classification Search
CPC ........ B60G 2204/41; B60G 2204/4104; B60G 21/0551; B60G 2200/144; B60G 11/12; B60G 2204/45; B60G 2204/14; B60G 2204/129; B60G 15/068; B60G 2204/4404; F16F 1/38; F16F 13/14; F16F 1/3835; F16C 2326/05
See application file for complete search history.

(56) References Cited

U.S. PATENT DOCUMENTS

| | | | | |
|---|---|---|---|---|
| 3,731,913 A * | 5/1973 | Hirst | F16F 1/41 | 267/294 |
| 4,286,827 A * | 9/1981 | Peterson | F16F 1/38 | 267/141.1 |
| 4,349,184 A * | 9/1982 | Peterson | F16F 1/38 | 267/141.1 |

(Continued)

FOREIGN PATENT DOCUMENTS

| | | | |
|---|---|---|---|
| CN | 101057087 B * | 5/2011 | F16F 13/1409 |
| CN | 105437897 A | 3/2016 | |

(Continued)

*Primary Examiner* — Robert A. Siconolfi
*Assistant Examiner* — Mahbubur Rashid
(74) *Attorney, Agent, or Firm* — Banner & Witcoff, Ltd.

(57) ABSTRACT

A bushing for a trailing arm may include an inner rod having a plate shape, a body in which a central portion of the inner rod is disposed, a reinforcing material disposed to surround an outer surface of the body, a first elastic member in which the reinforcing material is disposed, a second elastic member disposed around the first elastic member, and an outer steel member disposed to surround the first elastic member and the second elastic member. The reinforcing material may be disposed between the outer surface of the body and an inner surface of the first elastic member.

19 Claims, 6 Drawing Sheets

(56) References Cited

U.S. PATENT DOCUMENTS 5,024,461 A * 6/1991 Miyakawa .............. F16F 13/16 280/124.155
5,657,510 A * 8/1997 Satori .................... F16F 13/14 16/2.2
5,988,610 A * 11/1999 Hiraki .................... F16F 9/346 267/141.1
6,854,723 B2 * 2/2005 Ogawa .................. F16F 1/3842 267/141.5
6,997,614 B2 * 2/2006 Kammel ............... F16F 1/3863 384/275
7,478,803 B2 * 1/2009 Lee ....................... F16F 1/3835 267/293
9,382,961 B2 * 7/2016 Ishikawa ................... F16F 1/38
9,506,517 B2 * 11/2016 Cha ....................... F16F 1/3863
10,309,452 B2 * 6/2019 Mueller ................ F16F 1/3876
11,091,255 B2 * 8/2021 Jones ...................... B64C 27/51
11,226,003 B2 * 1/2022 Koczar ................. F16C 27/063
2002/0154940 A1 * 10/2002 Certain ..................... F16F 1/38 403/24
2003/0230866 A1 * 12/2003 Lee ........................ A63C 17/06 280/124.165
2004/0056397 A1 * 3/2004 Tatura ..................... F16F 1/387 267/293
2006/0151929 A1 * 7/2006 Franck ................ F16F 13/1463 267/293
2016/0052357 A1 * 2/2016 Cha ....................... F16F 1/3863 29/896.91
2016/0186807 A1 6/2016 Keller
2021/0310505 A1 * 10/2021 Vippach ................ F16B 5/0258
2021/0396295 A1 * 12/2021 Rawlings ............ F16F 13/1463
2022/0196107 A1 * 6/2022 Gaspar ................ F16F 13/1409

FOREIGN PATENT DOCUMENTS

CN 112628348 A * 4/2021 ............ F16F 15/022
DE 3905686 C * 6/1990 .......... F16F 13/1481
EP 1806518 A1 * 7/2007 ............. B60G 7/005
EP 1817508 B1 * 2/2010 ......... B62D 33/0604
JP H0972365 A 3/1997
JP 3747783 B2 * 2/2006 ................ B61F 5/50
JP 4614255 B2 1/2011
JP 2011252533 A * 12/2011
KR 100203073 B1 6/1999
KR 20020061487 A 7/2002
KR 101551020 B1 9/2015

* cited by examiner 10
100
12
RW
13
14
11
14
100
12
13
RW

BUSHING FOR TRAILING ARM

CROSS-REFERENCE TO RELATED APPLICATION(S)

This application claims benefit of priority to Korean Patent Application No. 10-2022-0049611 filed on Apr. 21, 2022 in the Korean Intellectual Property Office, the disclosure of which is incorporated herein by reference in its entirety.

BACKGROUND

Types of vehicle suspensions include axle suspension type and independent suspension type. Vehicle suspensions may also be classified as a front suspension type and a rear suspension type according to installation positions in a vehicle. For an axle suspension type suspension, left and right wheels of the rear suspension portion may be connected by a single axle. Some passenger vehicles use an independent suspension type trailing arm, for example, to improve ride quality and stability.

SUMMARY

The following summary presents a simplified summary of certain features. The summary is not an extensive overview and is not intended to identify key or critical elements.

For a trailing arm (e.g., a trailing arm for an independent suspension type or any other suspension type), a knuckle and the trailing arm may be connected by a fastener (e.g., a bolt) and mounted on a vehicle body through a bushing of the trailing arm.

The trailing arm may include a bushing mounted on a vehicle body, a plate that may be bent according to lateral impacts, and a mounting portion that may be mounted on an axle (e.g., a rear axle). The structure may be relatively simple and a wheel alignment may be less frequently required and a tire is less worn in comparison with a suspension not equipped with the trailing arm. As such, the trailing arm may be used as a rear suspension of a front-wheel-drive car.

A bushing may include an outer steel member, rubber, and a composite inner rod. The inner rod may be formed of a steel plate and a plastic injection-molded product surrounding the steel plate. Such a bushing may have a shape without internal pores, thus incurring low production costs.

However, it may be difficult to secure impact resistance performance because the physical strength/durability of plastic is lower than that of aluminum/stainless steel. It may also be difficult to secure durability of rubber if an adhesion dispersion between plastic and rubber is large. Further, a peeling phenomenon may occur intermittently due to insufficient securing of adhesion between plastic and rubber. An improved bushing structure may address such problems.

A bushing may comprise: an inner rod configured to be coupled to a vehicle part; a body in which a central portion of the inner rod is disposed; a reinforcing material disposed to surround an outer surface of the body; a first elastic member comprising a coupling hole in which the reinforcing material and the body are disposed; a second elastic member disposed around one or more portions of the first elastic member; and an outer steel member disposed to surround the first elastic member and the second elastic member. The reinforcing material may be disposed between the outer surface of the body and an inner surface of the first elastic member.

The body may have a plurality of stopping protrusions configured to locate the reinforcing material therebetween, and each of the plurality of stopping protrusions may have a coupling recess into which a coupling protrusion of the first elastic member is configured to be inserted.

The reinforcing material may comprise a metal material. The outer steel member may comprise a metal material. The reinforcing material and the outer steel member may be formed of a same material.

The body may comprise a plurality of through-hole portions. The plurality of through-hole portions may comprise: a first through-hole portion formed above the central portion of the inner rod; a second through-hole portion formed on a first side of the first through-hole portion; and a third through-hole portion formed on a second side of the first through-hole portion.

The body may comprise: an insertion hole in which the central portion of the inner rod is disposed; and a plurality of through-hole portions disposed above the inner rod. A direction of the insertion hole may correspond to directions of the plurality of through-hole portions.

The body may comprise a plurality of through-hole portions each having different hole sizes. The first elastic member and the second elastic member may comprise a same rubber material. The first elastic member and the second elastic member may comprise different rubber materials. The inner rod may comprise a plurality of fastening hole portions disposed at both ends of the inner rod. The central portion of the inner rod may comprise a fixing hole disposed between the plurality of fastening hole portions. The inner rod may comprise a coupling auxiliary member installed in the fixing hole and having a circular band shape.

The first elastic member may comprise: a ring portion having the coupling hole into which the reinforcing material is inserted; an extension portion extending from the ring portion; and a joint portion disposed at an end of the extension portion and joined to an inner circumferential surface of the outer steel member. The bushing may be connected to a trailing arm of a vehicle.

An apparatus may comprise: an inner rod configured to be coupled to a vibrating part; a body in which a central portion of the inner rod is disposed; a reinforcing material disposed to surround an outer surface of the body; and a first elastic member comprising a coupling hole in which the reinforcing material is disposed. Strength of the reinforcing material may be greater than strength of the body and strength of the first elastic member.

The apparatus may comprise a bushing connected to a trailing arm of a vehicle. The reinforcing material may have an hole, and an inner curved surface of the reinforcing material may be configured to surround an outer curved surface of the body. An inner curved surface of the first elastic member may be configured to surround an outer curved surface of the reinforcing material.

These and other features and advantages are described in greater detail below.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
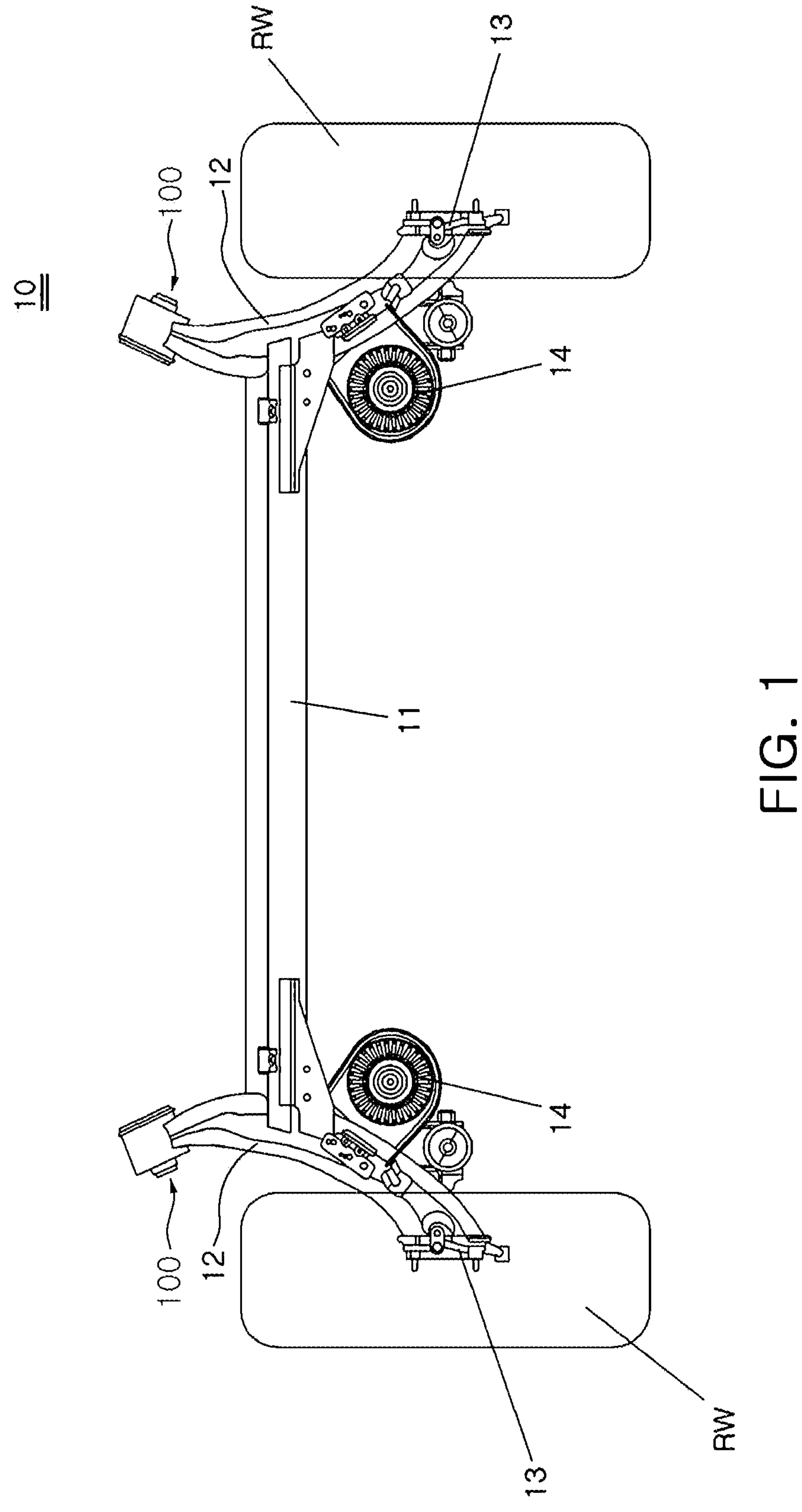
FIG. 1 is a schematic diagram illustrating a suspension including a trailing arm.

Examples described in the present specification and the configurations illustrated in the drawings are to describe various aspects of the present disclosure and are not intended to represent all of the technical ideas and implementations of the present disclosure. Accordingly, it should be understood that various equivalents and modifications may be implemented by one skilled in the art at the time of the present application.

Various examples of the present disclosure will now be described in detail with reference to the accompanying drawings. The described examples may, however, be exemplified in many different forms and should not be construed as being limited to the specific embodiment(s) set forth herein. Rather, these examples are provided so that this disclosure will be thorough and complete, and will fully convey the scope of the inventive concept to those skilled in the art. In the drawings, the shapes and dimensions of elements may be exaggerated for clarity.

In addition, in the present specification, the singular expression includes a plural expression unless the context clearly dictates otherwise, and the same reference numerals refer to the same or corresponding components throughout the specification.

In addition, in the present disclosure, expressions of upper side, upper portion, lower side, lower portion, side surface, front surface, rear surface, etc. are expressed based on the direction shown in the drawings, and it should be appreciated that these portions and surfaces may be expressed to be different if a direction of a corresponding object is changed.

FIG. 1 is a schematic diagram illustrating a suspension including a trailing arm.

Referring to FIG. 1, a suspension 10 (e.g., coupled torsion beam axle (CTBA)) may include, for example, a torsion beam 11 provided in a width direction of a vehicle (e.g., between the left side and the right side of the vehicle), and a trailing arm 12 provided at both ends of the torsion beam 11, a wheel mount bracket 13 in which a wheel (e.g., a rear wheel RW) is mounted at an end portion of the trailing arm 12, and a spring seat 14 on which a spring is mounted.

A bushing 100 for a trailing arm may be coupled to a bracket 13 on a vehicle body side installed at a tip of the trailing arm 12 in the suspension 10.

The suspension 10 of the vehicle may reduce an effect of impacts transmitted through wheels when a rear wheel of the vehicle passes on an irregular portion of a road and/or when the vehicle bumps or rebounds while turning.

If the trailing arm 12 and the bushing 100 for the trailing arm are tilted, when installed, in the suspension 10 of the vehicle, wear may occur as the bushing 100 for the trailing arm is deformed by continuous use.

Figure 2:
FIG. 2 is a perspective view illustrating an example bushing for a trailing arm according to the present disclosure.
Figure 2:
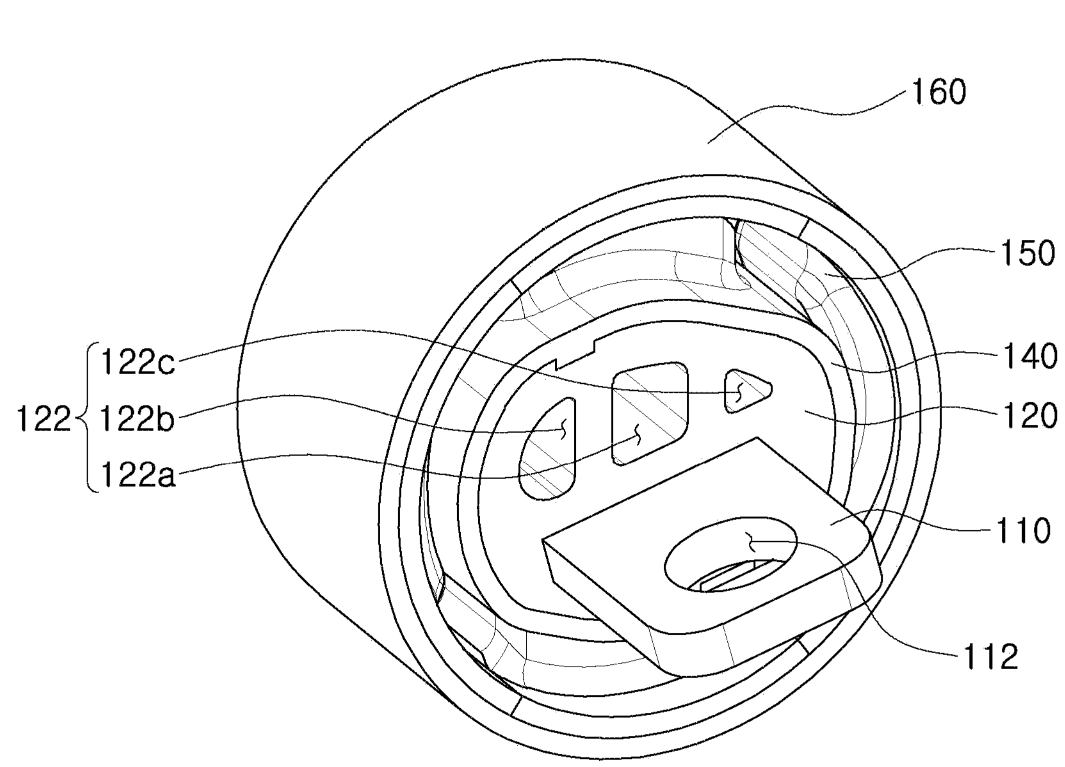
Figure 3:
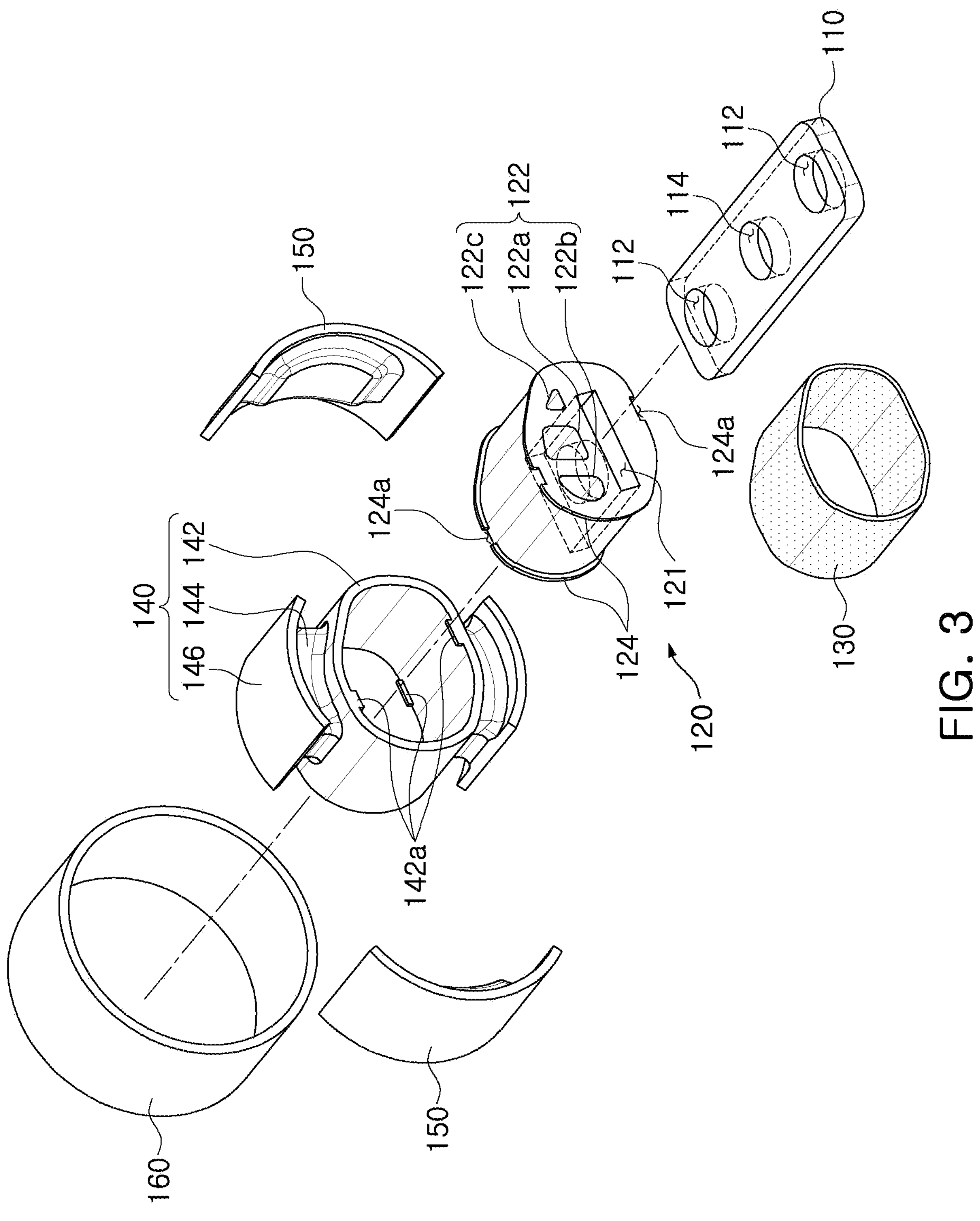
FIG. 3 is an exploded perspective view illustrating an example bushing for a trailing arm according to the present disclosure.
Figure 4:
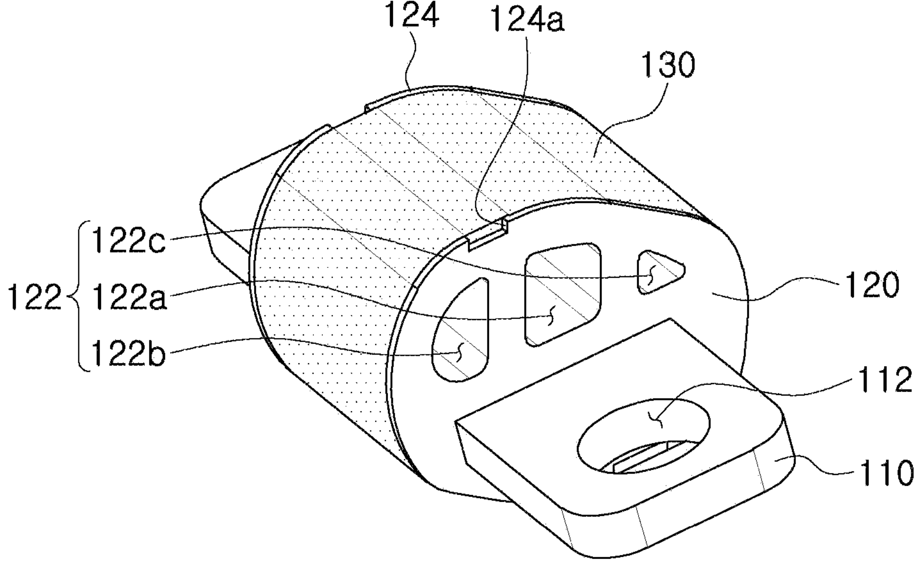
FIG. 4 is a perspective view illustrating an example coupling configuration of an inner rod, a body, and a reinforcing material of a bushing for a trailing arm according to the present disclosure.

FIG. 2 is a perspective view illustrating an example bushing for a trailing arm according to the present disclosure, FIG. 3 is an exploded perspective view illustrating an example bushing for a trailing arm according to the present disclosure, and FIG. 4 is a perspective view illustrating a combined configuration of an inner rod, a body, and a reinforcing material of an example bushing for a trailing arm according to the present disclosure.

Referring to FIGS. 2 to 4, the bushing 100 for a trailing arm may include, as an example, an inner rod 110, a body 120, a reinforcing material 130, a first elastic member 140, a second elastic member 150, and an outer steel member 160.

The inner rod 110 may have a plate shape, and both end portions thereof may be disposed to protrude from both sides of the body 120 when coupled to the body 120. The inner rod 110 may have fastening hole portions 112 at both end portions thereof. When the inner rod 110 is disposed at a fastening position, a fastening bolt may be inserted into each of the fastening hole portions 112 and the fastening bolts may be fastened to a vehicle part (e.g., a vehicle body). The inner rod 110 may be fixed to the vehicle body if the fastening bolts are fastened to the vehicle part. A fixing hole 114 that may be disposed between the fastening hole portions 112 may be provided in a central portion of the inner rod 110. The fixing hole 114 may be embedded in the body 120. The inner rod 110 may be formed of a metal material or any other suitable material providing durability. For example, the inner rod 110 may be formed of a steel material.

The body 120 may be disposed to surround the central portion of the inner rod 110. To this end, the body 120 may have an insertion hole 121 into which the inner rod 110 is inserted. The body 120 may be formed of a synthetic resin material or any other suitable material. The body 120 may include one or more through-hole portions 122 disposed above the insertion hole 121 and penetrating in a length direction of the inner rod 110. The through-hole portion(s) 122 may be provided in the body 120 to be disposed above the inner rod 110. An edge of the body 120 may include a stopping protrusion 124 for preventing the reinforcing material 130 from being separated. The stopping protrusion 124 may have a height corresponding to the thickness of the reinforcing material 130. The stopping protrusion 124 may have a coupling recess **124*a* for coupling the reinforcing material 130 to the body 120. A plurality of coupling recesses 124*a* (e.g., two coupling recesses) may be provided at both ends of the body 120**.

The inner rod 110 may be disposed to be inclined. The inner rod 110 may be installed in the body 120 to reduce deformation due to a front load and a rear load. As an example, the through-hole portion(s) 122 may include a first through-hole portion **122*a* disposed in the central portion, a second through-hole portion 122*b* disposed at one side of the first through-hole portion 122*a*, and a third through-hole portion 126*c* disposed at the other side of the first through-hole portion 122*a*. The sizes of the first, second, and third through-hole portions 122*a*, 122*b*, and 122*c* may be different from each other. For example, the sizes of the first, second, and third through-hole portions 122*a*, 122*b*, and 122*c* may be formed to be different from each other so that the body 120 has a predetermined thickness or greater. Accordingly, the body 120 may have a strength greater than or equal to a certain strength. When a load or force is applied from the outside, by forming the first, second, and third through-hole portions 122***a*, 122*b*, and 122*c*, the body 120 may absorb the load/force applied from the outside to reduce the amount of impacts. The first, second, and third through-hole portions 122*a*, 122*b*, and 122*c* may also be inclined in a direction in which the inner rod 110 is inclined.

The body 120 may be molded by injection molding, for example, after the inner rod 110 is installed in a mold for injection molding of the body 120. Accordingly, the central portion of the inner rod 110 may be disposed to be inserted into the body 120.

The reinforcing material 130 may be installed to surround the body 120 and may be formed of a metal material (or any other suitable material) to reinforce strength. For example, the reinforcing material 130 may be formed of an aluminum material. However, aspects of the present disclosure are not limited thereto, and the material of the reinforcing material 130 may include other material(s), such as stainless steel. The reinforcing material 130 may have a band shape (or any other shape). For example, the reinforcing material 130 may be coupled to the body 120 to be disposed between the stopping protrusions 124 at both ends of the body 120. Accordingly, the reinforcing material 130 may be securely fixed onto the body 120 and may not be easily separated from the body 120. In this manner, since the reinforcing material 130 is installed on the body 120, the strength with respect to the front load and the rear load may be increased.

Figure 5:
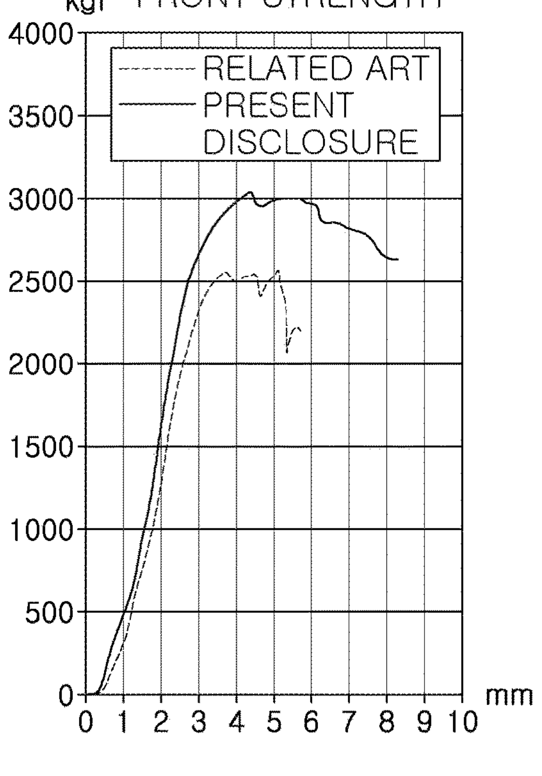
FIG. 5 is a graph illustrating a front load strength of an example bushing for a trailing arm in comparison with a front load strength of a bushing of a related art.
Figure 6:
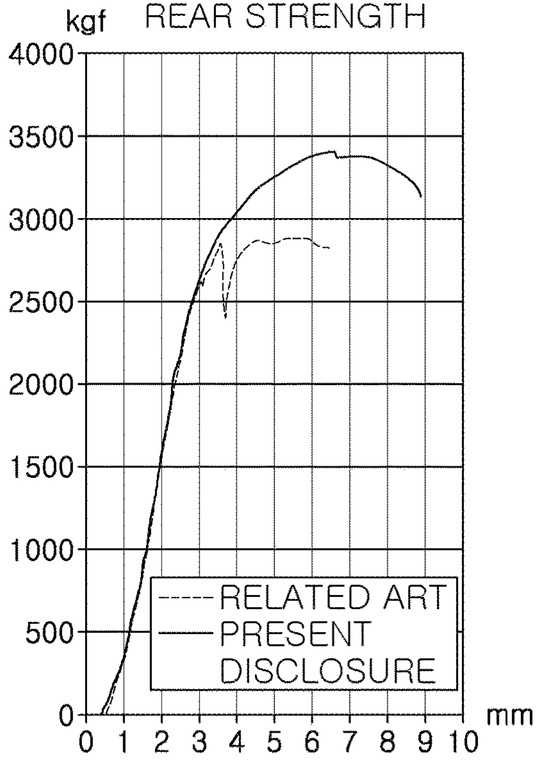
FIG. 6 is a graph illustrating a rear load strength of an example bushing for a trailing arm in comparison with a rear load strength of a related art.

As shown in FIG. 5, for a bushing of a related art in which the reinforcing material 130 is not provided, the strength with respect to the front load is approximately 2,500 kgf, but for an example bushing in which the reinforcing material 130 is provided, the strength with respect to the front load may be approximately 3,000 kgf. As shown in FIG. 6, for a bushing of a related art in which the reinforcing material 130 is not provided, the strength with respect to the rear load is approximately 2,770 kgf, but for an example bushing in which the reinforcing material 130 is provided, the strength with respect to the rear load is approximately 3,400 kgf.

In this manner, the strength with respect to the front load and the rear load may be increased by the reinforcing material 130. As an example, the reinforcing material 130 may have a thickness of approximately 3 mm (or any other suitable thickness).

The reinforcing material 130 may be installed in a mold for injection molding of the body 120 together with the inner rod 110 and then coupled to the body 120 molded by injection molding.

The first elastic member 140 may include a ring portion 142 through which a combined structure of the inner rod 110, the body 120, and the reinforcing material 130 penetrates for installation. The first elastic member 140 may include an extension portion 144 extending from a ring portion 142 and a joint portion 146 disposed at an end of the extension portion 144 and joined to an inner circumferential surface of the outer steel member 160. The first elastic member 140 may be formed of a material having elasticity, for example, a rubber material. As an example, the first elastic member 140 may serve to fix the body 120 and the reinforcing material 130. To this end, the first elastic member 140 may include a coupling protrusion 142*a* inserted into the coupling recess 124*a* formed in the stopping protrusion 124 of the body 120. Accordingly, a coupling between the first elastic member 140 and the body 120 may be improved. When the first elastic member 140 and the reinforcing material 130 are joined, a bonding force may be increased compared to the busing of the related art in which the first elastic member 140 and the body 120 are coupled to each other.

The second elastic member 150 may be disposed around the first elastic member 140. As an example, the second elastic members 150 may be joined to an inner surface of the outer steel member 160, and may be alternately disposed with the first elastic members 140. For example, the joint portion 146 of the first elastic member 140 may be provided at upper and lower portions of the ring portion 142, and the joint portion 146 may be joined to the inner surface of the outer steel member 160. The second elastic member 150 may be joined to the inner surface of the outer steel member 160 to be disposed between the joint portions 146 of the first elastic member 140.

The second elastic member 150 may be formed of, for example, a rubber material (or any other suitable elastic material). The second elastic member 150 may be formed of a rubber material different from the first elastic member 140. However, aspects of the present disclosure are not limited thereto, and the second elastic member 150 may be formed of the same material as the first elastic member 140.

The first and second elastic members 140 and 150 may serve to absorb impacts caused by an external force applied thereto. The first and second elastic members 150 may be molded by curing or any other method. For example, the first and second elastic members 140 and 150 may be heated and pressed in a mold so that rubber may react with sulfur to have certain strength and elasticity.

The outer steel member 160 may be disposed to surround the first and second elastic members 140 and 150 and may have a circular band shape, for example. The joint portion 146 of the first elastic member 140 and the outer peripheral surface of the second elastic member 150 may be joined to the inner surface of the outer steel member 160. The outer steel member 160 may be formed of a metal material (or any other suitable material). The outer steel member 160 may be formed of the same material as the reinforcing material 130. For example, the outer steel member 160 may be formed of an aluminum material (or any other suitable material). However, aspects of the present disclosure are not limited thereto, and the material of the outer steel member 160 may include other material(s), such as stainless steel.

As described above, since the reinforcing material 130 is disposed to surround the body 120, strength may be increased. Further, if the reinforcing material 130 is disposed to surround the body 120, a size of the inner rod 110 may be reduced, thereby reducing the size of the overall bushing structure.

Further, since a component for coupling the inner rod 110 to the body 120 may be omitted, manufacturing costs may be reduced.

Also, since the reinforcing material 130 may be joined to the first elastic member 140, bonding force may be increased. Further, since the first elastic member 140 and the reinforcing material 130 are joined, a manufacturing time may be shortened. For example, a curing time of the first elastic member 140 disposed to surround the reinforcing material 130 may be reduced.

Further, since the coupling protrusion 142 of the first elastic member 140 is coupled to the coupling recess 124*a* of the body 120, a coupling configuration of the reinforcing material 130, the body 120, and the inner rod 110 and a coupling strength of the first elastic member 140 may be increased.

Figure 7:
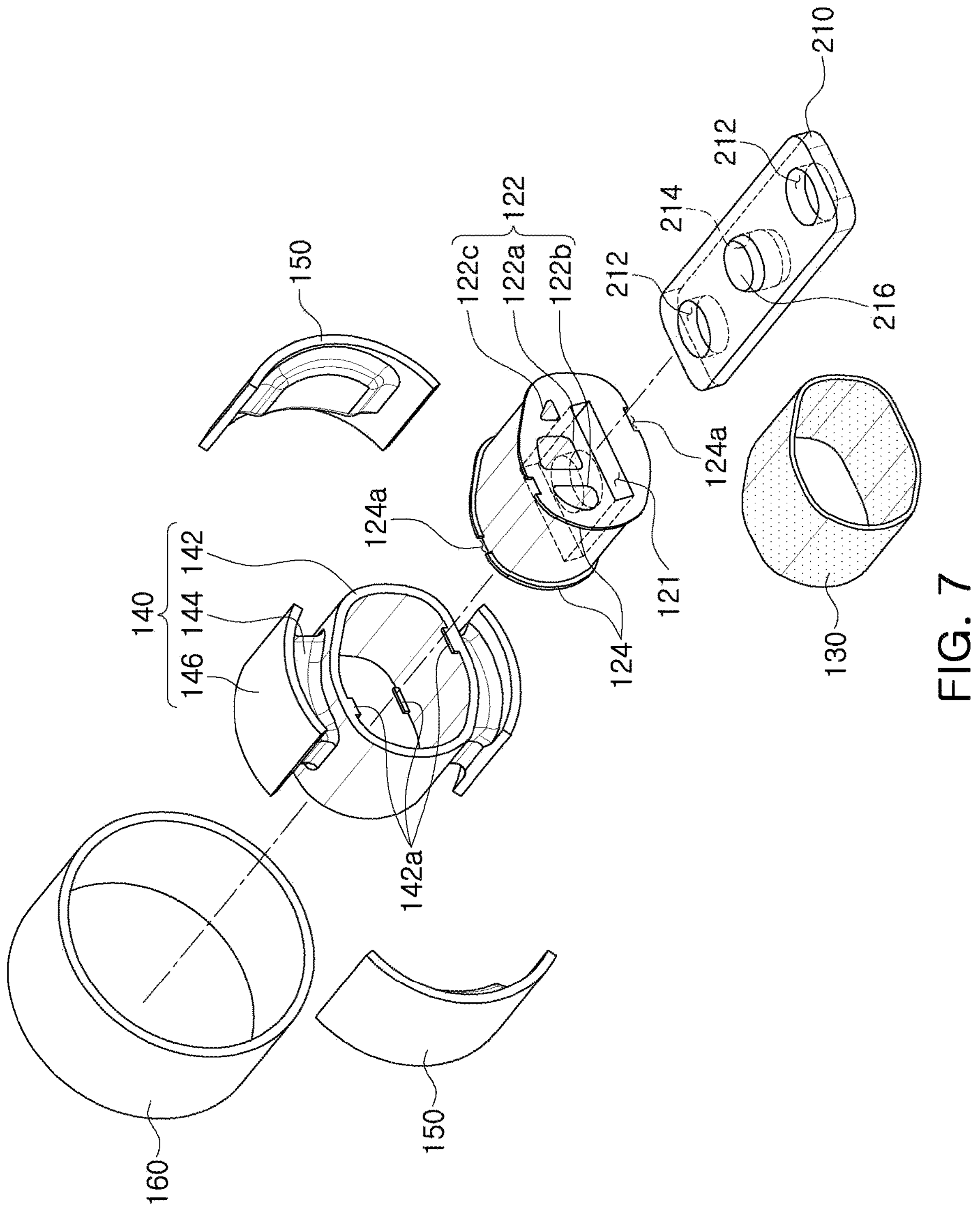
FIG. 7 is an exploded perspective view illustrating an example bushing for a trailing arm according to the present disclosure.

FIG. 7 is an exploded perspective view illustrating an example bushing for a trailing arm according to the present disclosure.

Referring to FIG. 7, a bushing 200 for a trailing arm may include, as an example, an inner rod 210, a body 120, a reinforcing material 130, a first elastic member 140, a second elastic member 150, and an outer steel member 160.

The body 120, the reinforcing material 130, the first elastic member 140, the second elastic member 150, and the outer steel member 160 may be substantially similar to the components described above with respect to FIGS. 2-4. Accordingly, a detailed description thereof will be omitted.

The inner rod 210 may have a plate shape, and both end portions thereof may be disposed to protrude from both sides of the body 120 when coupled to the body 120. The inner rod 210 may have fastening hole portions 212 at both end portions thereof. When the inner rod 210 is disposed at a fastening position, a fastening bolt may be inserted into each of the fastening hole portion 212 and fastening bolts may be fastened to a vehicle part (e.g., a vehicle body), the inner rod 210 may be fixed to the vehicle part, for example, by the fastening bolts. A fixing hole 214 disposed between the fastening hole portions 212 may be provided in a central portion of the inner rod 210. The fixing hole 214 may be disposed to be embedded in the body 120. A coupling auxiliary member 216 for increasing coupling force between the inner rod 210 and the body 120 may be installed in the fixing hole 214. The coupling auxiliary member 216 may serve to increase a surface contact area with the body 120, and may have a circular ring shape, for example. The inner rod 210 may be formed of, for example, a metal material (or any other suitable material). The inner rod 210 may be formed of, for example, a steel material.

As described above, the coupling force between the inner rod 210 and the body 120 may be increased by providing the coupling auxiliary member 216 to the inner rod 210. Accordingly, the bushing 200 for a trailing arm may be installed in a vehicle to which greater front and rear loads are applied.

A bushing for a trailing arm may have improved strength, thereby preventing damage due to impacts.

A bushing for a trailing arm may have increased durability by reducing adhesion dispersion between an inner rod and an elastic member.

A bushing for a trailing arm may include: an inner rod having a plate shape; a body in which a central portion of the inner rod is embedded; a reinforcing material disposed to surround an outer surface of the body; a first elastic member in which the reinforcing material is insertedly disposed; a second elastic member disposed around the first elastic member; and an outer steel member disposed to surround the first and second elastic members, wherein the reinforcing material is disposed between the outer surface of the body and an inner surface of the first elastic member.

The body may have a stopping protrusion for preventing separation of the reinforcing material, and the stopping protrusion may have a coupling recess into which a coupling protrusion of the first elastic member is inserted.

The reinforcing material may be formed of a metal material.

The outer steel member may be formed of a metal material.

The reinforcing material and the outer steel member may be formed of the same material.

The body may include a through-portion disposed in a length direction of the inner rod, and the through-portion may include a first through-portion disposed above the central portion of the inner rod, a second through-portion disposed on one side of the first through-portion, and a third through-portion disposed on the other side of the first through-portion.

The through-portion may be disposed above the inner rod.

The first to third through-portions may have different sizes.

The first and second elastic members may be formed of a rubber material.

The first and second elastic members may be formed of different rubber materials.

Fastening hole portions may be provided at both ends of the inner rod.

A fixing hole disposed between the fastening hole portions may be provided in a central portion of the inner rod.

The inner rod may include a coupling auxiliary member installed in the fixing hole and having a circular band shape.

The first elastic member may include a ring portion having a coupling hole into which the reinforcing material is inserted, an extension portion extending from the ring portion, and a joint portion disposed at an end of the extension portion and joined to an inner circumferential surface of the outer steel member.

A bushing for a trailing arm may include: an inner rod having a plate shape, a body in which a central portion of the inner rod is embedded; a reinforcing material disposed to surround an outer surface of the body; and a first elastic member in which the reinforcing material is insertedly disposed, wherein the reinforcing material may have a strength greater than that of the body and the first elastic member.

According to one or more examples described above, strength of a bushing may be improved, and thus, damage due to impacts may be prevented/reduced.

According to one or more examples described above, durability may be secured by reducing an adhesion dispersion between the inner rod and the first and second elastic members.

While various examples have been shown and described above, it will be apparent to those skilled in the art that modifications and variations could be made without departing from the scope of the present disclosure as defined by the appended claims.

What is claimed is:

1. A bushing comprising:

a body;

an inner rod configured to be coupled to a vehicle part and disposed in a central portion of the body that surrounds a central portion of the inner rod;

a reinforcing material disposed to surround an outer surface of the body;

a first elastic member comprising a coupling hole in which the reinforcing material and the body are disposed;

a second elastic member disposed around one or more portions of the first elastic member; and an outer steel member disposed to surround the first elastic member and the second elastic member, wherein the reinforcing material is disposed between the outer surface of the body and an inner surface of the first elastic member, and wherein the body has a plurality of stopping protrusions configured to locate the reinforcing material therebetween, and each of the plurality of stopping protrusions has a coupling recess into which a coupling protrusion of the first elastic member is configured to be inserted.

2. The bushing of claim 1, wherein the reinforcing material comprises a metal material.

3. The bushing of claim 1, wherein the outer steel member comprises a metal material.

4. The bushing of claim 1, wherein the reinforcing material and the outer steel member are formed of a same material.

5. The bushing of claim 1, wherein the body comprises a plurality of through-hole portions, and the plurality of through-hole portions comprises:

a first through-hole portion formed above the central portion of the inner rod;

a second through-hole portion formed on a first side of the first through-hole portion; and a third through-hole portion formed on a second side of the first through-hole portion.

6. The bushing of claim 1, wherein the body comprises:

an insertion hole in which the central portion of the inner rod is disposed; and a plurality of through-hole portions disposed above the inner rod, wherein a direction of the insertion hole corresponds to directions of the plurality of through-hole portions.

7. The bushing of claim 1, wherein the body comprises a plurality of through-hole portions each having different hole sizes.

8. The bushing of claim 1, wherein the first elastic member and the second elastic member comprise a same rubber material.

9. The bushing of claim 1, wherein the first elastic member and the second elastic member comprise different rubber materials.

10. The bushing of claim 1, wherein the inner rod comprises a plurality of fastening hole portions disposed at both ends of the inner rod.

11. The bushing of claim 1, wherein the first elastic member comprises:

a ring portion having the coupling hole into which the reinforcing material is inserted;

an extension portion extending from the ring portion; and a joint portion disposed at an end of the extension portion and joined to an inner circumferential surface of the outer steel member.

12. The bushing of claim 1, wherein the bushing is connected to a trailing arm of a vehicle, and wherein the central portion of the inner rod comprises a fixing hole embedded in the body.

13. A bushing comprising:

an inner rod configured to be coupled to a vehicle part;

a body in which a central portion of the inner rod is disposed;

a reinforcing material disposed to surround an outer surface of the body;

a first elastic member comprising a coupling hole in which the reinforcing material and the body are disposed;

a second elastic member disposed around one or more portions of the first elastic member; and an outer steel member disposed to surround the first elastic member and the second elastic member, wherein the reinforcing material is disposed between the outer surface of the body and an inner surface of the first elastic member, and wherein the central portion of the inner rod comprises a fixing hole.

14. The bushing of claim 13, wherein the inner rod comprises a coupling auxiliary member installed in the fixing hole and having a circular band shape.

15. An apparatus comprising:

an inner rod configured to be coupled to a vibrating part;

a body in which a central portion of the inner rod is disposed;

a reinforcing material disposed to surround an outer surface of the body; and a first elastic member comprising a coupling hole in which the reinforcing material is disposed, wherein strength of the reinforcing material is greater than strength of the body and strength of the first elastic member, and wherein the central portion of the inner rod comprises a fixing hole.

16. The apparatus of claim 15, wherein the apparatus comprises a bushing connected to a trailing arm of a vehicle.

17. The apparatus of claim 15, wherein the reinforcing material has a hole, and wherein an inner curved surface of the reinforcing material is configured to surround an outer curved surface of the body.

18. The apparatus of claim 15, wherein an inner curved surface of the first elastic member is configured to surround an outer curved surface of the reinforcing material.

19. The apparatus of claim 15, wherein the inner rod comprises a plurality of fastening hole portions disposed at both ends of the inner rod, and wherein the fixing hole is disposed between the plurality of fastening hole portions.

* * * * *